(12) United States Patent
Szybalski et al.

(10) Patent No.: US 8,260,482 B1
(45) Date of Patent: Sep. 4, 2012

(54) USER INTERFACE FOR DISPLAYING INTERNAL STATE OF AUTONOMOUS DRIVING SYSTEM

(75) Inventors: Andrew Szybalski, San Francisco, CA (US); Luis Ricardo Prada Gomez, San Leandro, CA (US); Philip Nemec, San Jose, CA (US); Christopher Urmson, Mountain View, CA (US); Sebastian Thrun, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 12/832,447

(22) Filed: Jul. 8, 2010

Related U.S. Application Data

(63) Continuation-in-part of application No. 12/769,252, filed on Apr. 28, 2010.

(51) Int. Cl.
*G05D 1/02* (2006.01)
*B62D 6/00* (2006.01)

(52) U.S. Cl. .............................. 701/23; 701/41; 701/410

(58) Field of Classification Search .......... 701/1, 23–25, 701/27, 28, 41, 44, 117, 408–410, 301, 302
See application file for complete search history.

(56) References Cited

U.S. PATENT DOCUMENTS

| | | | | |
|---|---|---|---|---|
| 5,838,562 A * | 11/1998 | Gudat et al. ..................... 701/23 |
| 5,983,161 A * | 11/1999 | Lemelson et al. ............ 701/301 |
| 6,275,773 B1 * | 8/2001 | Lemelson et al. ............ 701/301 |
| 6,337,638 B1 | 1/2002 | Bates et al. |
| 6,487,500 B2 * | 11/2002 | Lemelson et al. ............ 701/301 |
| 6,516,262 B2 * | 2/2003 | Takenaga et al. ............... 701/96 |
| 7,295,904 B2 | 11/2007 | Kanevsky et al. |
| 7,327,238 B2 | 2/2008 | Bhogal et al. |
| 7,430,473 B2 * | 9/2008 | Foo et al. ...................... 701/455 |
| 7,446,649 B2 | 11/2008 | Bhogal et al. |
| 7,486,176 B2 | 2/2009 | Bhogal et al. |
| 7,486,177 B2 | 2/2009 | Wilbrink et al. |
| 7,865,310 B2 * | 1/2011 | Nakano et al. ................ 701/301 |
| 7,925,438 B2 * | 4/2011 | Lo ................................... 701/436 |
| 7,979,172 B2 * | 7/2011 | Breed ............................. 701/23 |
| 7,979,173 B2 * | 7/2011 | Breed ............................. 701/23 |
| 8,050,863 B2 * | 11/2011 | Trepagnier et al. ........... 701/514 |
| 8,126,642 B2 * | 2/2012 | Trepagnier et al. ........... 180/167 |
| 2005/0234612 A1 * | 10/2005 | Bottomley et al. ............. 701/23 |
| 2008/0071177 A1 | 3/2008 | Yanagidaira et al. |
| 2008/0119994 A1 | 5/2008 | Kameyama |

(Continued)

OTHER PUBLICATIONS

Sebastian, et al., Stanley: The Robot That Won the DARPA Grand Challenge, Journal of Field Robotics 23(9), 661-692 (2006), 2006 Wiley Periodicals, Inc.
Sebastian Thrun, Toward Robotic Cars, Apr. 2010, pp. 99-106, No. 4, Communications of the ACM.

*Primary Examiner* — Drew Brown
(74) *Attorney, Agent, or Firm* — Lerner, David, Littenberg, Krumholz & Mentlik, LLP

(57) ABSTRACT

A passenger in an automated vehicle may relinquish control of the vehicle to a control computer when the control computer has determined that it may maneuver the vehicle safely to a destination. The passenger may relinquish or regain control of the vehicle by applying different degrees of pressure, for example, on a steering wheel of the vehicle. The control computer may convey status information to a passenger in a variety of ways including by illuminating elements of the vehicle. The color and location of the illumination may indicate the status of the control computer, for example, whether the control computer has been armed, is ready to take control of the vehicle, or is currently controlling the vehicle.

20 Claims, 16 Drawing Sheets

U.S. PATENT DOCUMENTS

2010/0063663 A1* 3/2010 Tolstedt et al. .................. 701/23
2010/0168998 A1 7/2010 Matsunaga
2010/0222976 A1 9/2010 Haug
2011/0193722 A1* 8/2011 Johnson ........................ 340/906
2012/0035788 A1* 2/2012 Trepagnier et al. ............... 701/3

* cited by examiner

USER INTERFACE FOR DISPLAYING INTERNAL STATE OF AUTONOMOUS DRIVING SYSTEM

CROSS-REFERENCE TO RELATED APPLICATIONS

The present application is a continuation-in-part of U.S. patent application Ser. No. 12/769,252, filed Apr. 28, 2010, the entire disclosure of which is hereby incorporated herein by reference.

BACKGROUND OF THE INVENTION

1. Field of the Invention

The invention relates generally to user interface applications for autonomous driving systems. More specifically, user interfaces for displaying the status of the autonomous driving system are provided.

2. Description of Related Art

Autonomous vehicles use various computing systems to transport passengers from one location to another. Some autonomous vehicles may require some initial input or continuous input from an operator, such as a pilot, driver, or passenger. Other systems, for example autopilot systems, may be used only when the system has been engaged, thus the operator may switch from a manual to an autonomous mode where the vehicle drives itself. These systems may be highly complicated and generally do not provide for a user friendly experience.

BRIEF SUMMARY OF THE INVENTION

A passenger in an automated vehicle may relinquish control of the vehicle to a control computer when the control computer has determined that it may maneuver the vehicle safely to a destination. The passenger may relinquish or regain control of the vehicle by applying different degrees of pressure, for example, on a steering wheel of the vehicle. The control computer may convey status information to a passenger in a variety of ways including by illuminating elements of the vehicle. The color and location of the illumination may indicate the status of the control computer, for example, whether the control computer has been armed, is ready to take control of the vehicle, or is currently controlling the vehicle.

One aspect of the invention provides a vehicle including a plurality of control apparatuses including a braking apparatus, an acceleration apparatus, and a steering apparatus; a geographic position component for determining the current geographic location of the vehicle; a force input apparatus for identifying the approximate location and degree of a force; memory for storing a detailed map information including roadway, traffic signal, and intersection information; and a processor. The processor is operable to receive location information from the geographic position component; receive input from the force input apparatus; determine, from location information received from the geographic position component and the stored map information, the current geographic location of the vehicle; determine, based on the current geographic location of the vehicle, whether the processor can control the plurality of control apparatuses safely; and determine, based on input received from the force input apparatus, whether the processor has permission to control the plurality of control apparatuses.

In one example, the processor is operable to control the plurality of control apparatuses when the current geographic location of the vehicle corresponds to a roadway of the detailed roadway map. In another example, the vehicle also includes a light emitting apparatus and the processor is also operable to illuminate the light emitting apparatus if the processor has determined that the processor has permission to control the control apparatuses. In another example the force input apparatus is associated with a threshold value, and the processor is further operable to determine that the processor has permission if a force input on the force input apparatus is less than the threshold value. In another example, the processor is also operable to control the control apparatuses if the processor has determined that the processor has permission to control the control apparatuses. In one alternative, the vehicle also includes a light emitting apparatus and the processor is also programmed to illuminate the light emitting apparatus while the processor is controlling the control apparatuses. In another alternative, the processor is also configured to determine, based on the current geographic location of the vehicle, whether the processor can no longer control the control apparatuses safely; and discontinue the controlling of the control apparatuses if the processor can no longer control the control apparatuses safely. In this regard, the vehicle may also include a light emitting apparatus and the processor may also be operable to illuminate the light emitting apparatus if the processor discontinues the controlling of the control apparatuses because the processor can no longer control the control apparatuses safely. In another alternative, the force input apparatus is associated with a threshold value and the processor is further operable to discontinue control of the control apparatuses if a force input on the force input apparatus is greater than the threshold value. In another alternative, the vehicle also includes a light emitting apparatus and the processor is also operable to illuminate the light emitting apparatus in a first color if the processor can control the plurality of control apparatuses safely and the processor is not controlling the control apparatuses; control the control apparatuses and illuminate the light emitting apparatus in a second color if the processor has determined that the processor has permission to control the control apparatuses; and illuminate the light emitting apparatus in a third color if the processor discontinues the controlling of the control apparatuses because the processor can no longer control the control apparatuses safely.

Another aspect of the invention provides a method for controlling a plurality of control apparatuses of a vehicle including a braking apparatus, an acceleration apparatus, and a steering apparatus. The method includes receiving location information from a geographic position component for determining a current geographic location of the vehicle; receiving input from a force input apparatus identifying an approximate location and degree of a force; determining, from the location information received from the geographic position component and detailed map information, the current geographic location of the vehicle, the detailed map information including roadway, traffic signal and intersection information; determining, based on the current geographic location of the vehicle, whether a processor is operable to control the plurality of control apparatuses safely; determining, based on input received from the force input apparatus, whether the processor has permission to control the plurality of control apparatuses; and controlling the control apparatuses if the processor has permission to control the control apparatuses.

In one example, the force input apparatus is associated with a force threshold value and determining that the processor has permission is based on whether a force input on the force input apparatus is less than the threshold value. In another example, the method also includes illuminating a light emitting apparatus if the processor is not operable to control the control apparatuses safely. In another example, the method also includes illuminating a light emitting apparatus while the processor is controlling the control apparatuses. In another example, if the processor is not operable to control the control apparatuses safely, then discontinuing the controlling of the control apparatuses by the processor.

A further aspect of the invention provides a computer including memory for storing map information and a processor. The processor is operable to receive location information from a geographic position component which determines a current geographic location of the vehicle; receive input from a force input apparatus which identifies an approximate location and degree of a force; determine, from the location information received from the geographic position component and the stored map information, the current geographic location of the vehicle; determine, based on the current geographic location of the vehicle, whether the processor is operable to control a plurality of control apparatuses safely; and determine, based on input received from the force input apparatus, whether the processor has permission to control the plurality of control apparatuses.

In one example, the plurality of control apparatuses control an automobile. In another example, the plurality of control apparatuses control a boat. In another example, the plurality of control apparatuses control an airplane. In another example, the processor is also operable to illuminate light emitting apparatus in a first color if the processor is operable to control the plurality of control apparatuses safely and the processor is not currently controlling the control apparatuses; control the control apparatuses if the processor has determined that the processor has permission to control the control apparatuses and illuminate the light emitting apparatus in a second color; and illuminate the light emitting apparatus in a third color if the processor discontinues the controlling of the control apparatuses because the processor can no longer control the control apparatuses safely.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
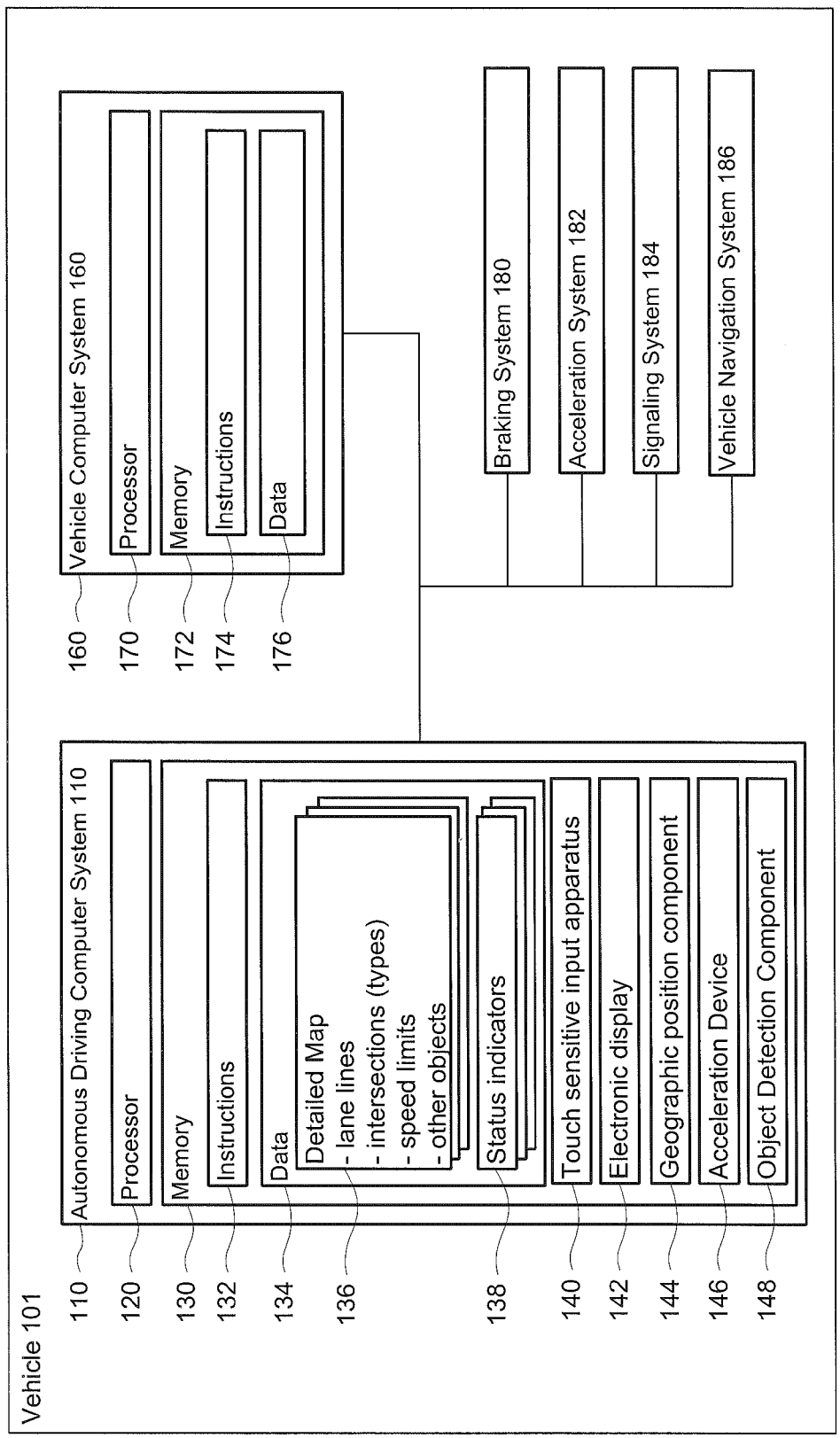
FIG. 1 is a functional diagram of a system in accordance with an aspect of the invention.

As shown in FIG. 1, an autonomous driving system 100 in accordance with one aspect of the invention includes a vehicle 101 with various components. The vehicle may be any type of vehicle including, but not limited to, cars, trucks, motorcycles, busses, boats, airplanes, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), and user input (e.g., a mouse, keyboard, touch-screen and/or microphone).

Computer 110 may also include a geographic position component 144 to determine the geographic location of the device. For example, computer 110 may include a GPS receiver to determine the device's latitude, longitude and/or altitude position. Other location systems such as laser-based localization systems, inertial-aided GPS, or camera-based localization may also be used.

Computer 110 may also include other features, such as an accelerometer, gyroscope or other acceleration device 146 to determine the direction in which the device is oriented. By way of example only, the acceleration device may determine its pitch, yaw or roll (or changes thereto) relative to the direction of gravity or a plane perpendicular thereto. In that regard, it will be understood that a computer's provision of location and orientation data as set forth herein may be provided automatically to the user, other computers, or both.

Computer 110 may also include an object detection component 148 to detect and identify the location and movement (e.g. relative speed) of objects such as other vehicles, obstacles in the roadway, traffic signals, signs, etc. The detection system may include lasers, sonar, radar, cameras or any other such detection methods. For example, the object detector may include an imaging device to identify the state of a particular traffic signal as yellow or another color. In use, computer 110 may use this information to instruct the braking system of the vehicle to apply the brakes.

Data 134 may include various types of information used by computer 110. Detailed map information 136 may include maps identifying lane lines, intersections, speed limits, traffic signals, buildings, signs, or other such information. For example, as will be described in more detail below, computer 110 may access detailed map information 136 in order to determine whether computer 110 is in a location from which it may competently control aspects particular aspects of vehicle 101 such as direction of travel, speed, acceleration, etc.

Computer 110 may also control status indicators 138, in order to convey the status of computer 110 to a passenger of vehicle 101. For example, computer 110 may use visual or audible cues to indicate whether computer 110 has been armed and is in control of the various systems of vehicle 101, whether there are any errors, whether computer 110 has been disarmed, etc. The various examples below describe visual cues which include either text on an electronic display, illuminated portions of vehicle 101, or both, although it will be understood that various other methods of indications may also be used.

Computer 110 may include, or be capable of receiving information from, one or more touch sensitive input apparatuses 140. For example, computer 110 may receive input from a user input apparatus and use this information to determine whether a passenger is contacting, such as by holding or bumping, a particular portion of vehicle 110. The touch sensitive input apparatuses may be any touch sensitive input device capable of identifying a force, for example a force resistance tape may be calibrated to accept or identify a threshold pressure input (such as 10 grams of pressure) or a range of pressures (such as 5-20 grams of pressure).

In one example, computer 110 may be an autonomous driving computing system capable of communicating with a vehicle's internal computer such as computer 160. Computer 160 may be configured similarly to computer 110, for example, including a processor 170, memory 172, instructions 174, and data 176. Computer 110 may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computers 110 and 160 are shown within vehicle 101, these elements may be external to vehicle 101 or physically separated by large distances.

Figure 2:
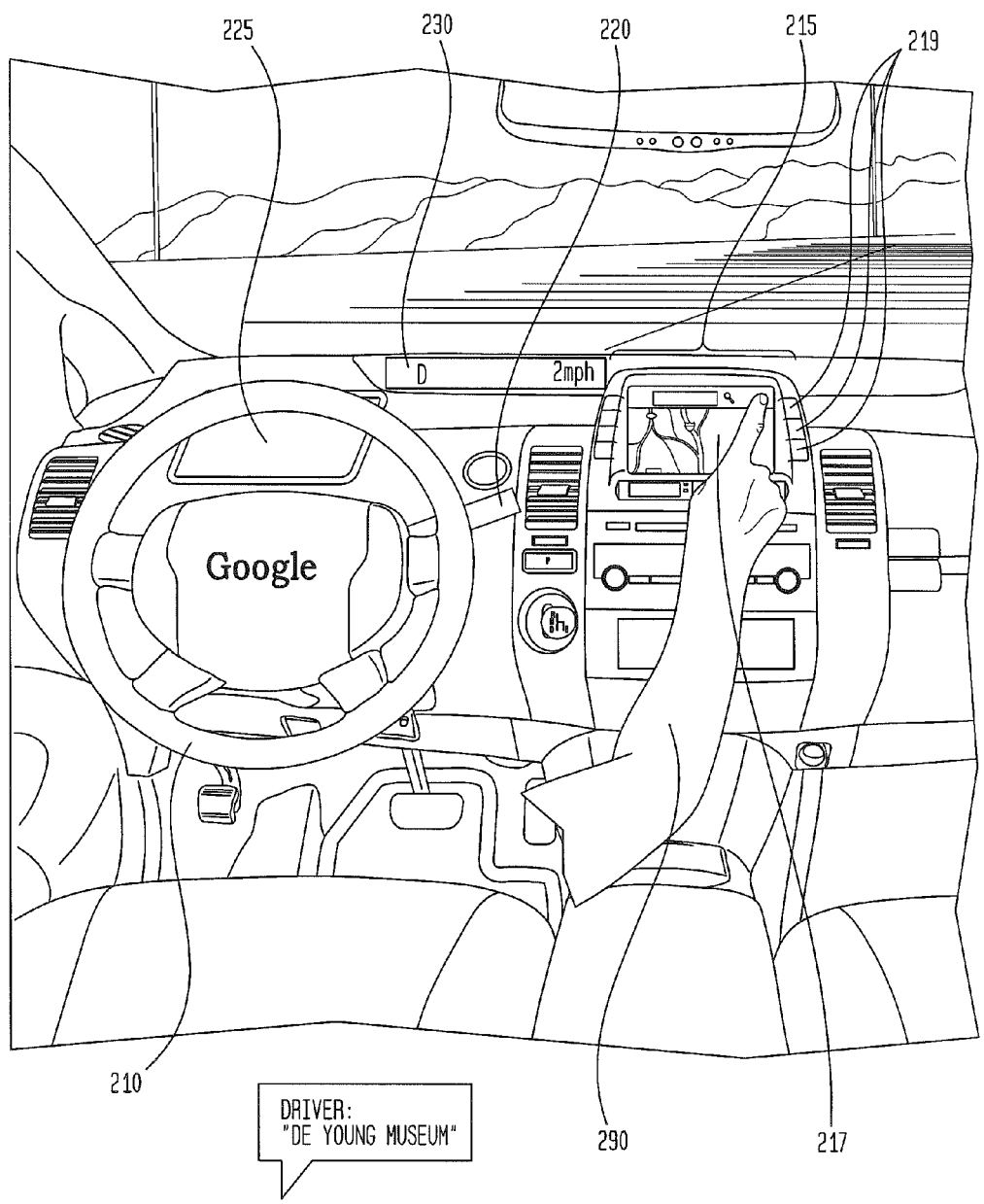
FIG. 2 is an exemplary design of the interior of an autonomous vehicle in accordance with an aspect of the invention.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220.

Vehicle 101 may include one or more user input devices for inputting information into the autonomous driving computer 110. For example, a user, such as passenger 290, may input a destination, (e.g. 123 Oak Street), into the navigation system using touch screen 217 or inputs 219. In another example, a user may input a destination by identifying the destination audibly (e.g. by stating "De young museum" as in the example of FIGS. 2 and 3).

Vehicle 101 may display information to a passenger in a number of ways. For example, vehicle 101 may be equipped with a display 225 for displaying information relating to computer 110. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. As will be described in more detail below various other audible and visual indicators may also be employed.

Figure 3:
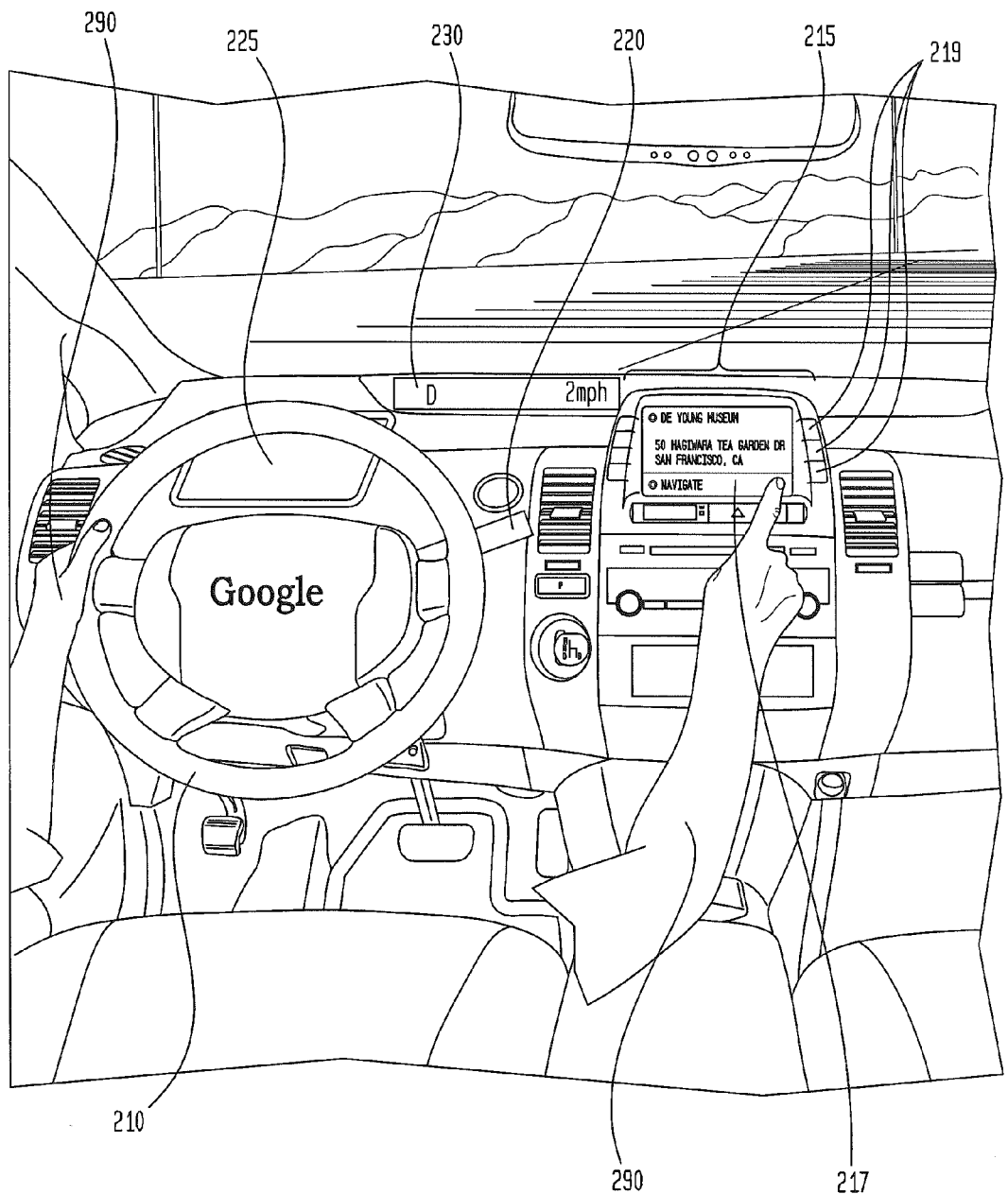
FIG. 3 is a view of the interior of an exemplary vehicle in accordance with an aspect of the invention.

The navigation system may generate a route between the present location of the vehicle and the destination. As shown in FIG. 3, after identifying the destination, navigation display 215 may indicate that a route has been identified. Once the user has selected the identified route, the navigation system may begin the route guidance, for as shown in FIG. 4.

When the passenger is ready to relinquish some level of control to the autonomous driving computing system or control computer, the user may arm the control computer. For example, the passenger may press a button to arm computer 110.

Figure 4:
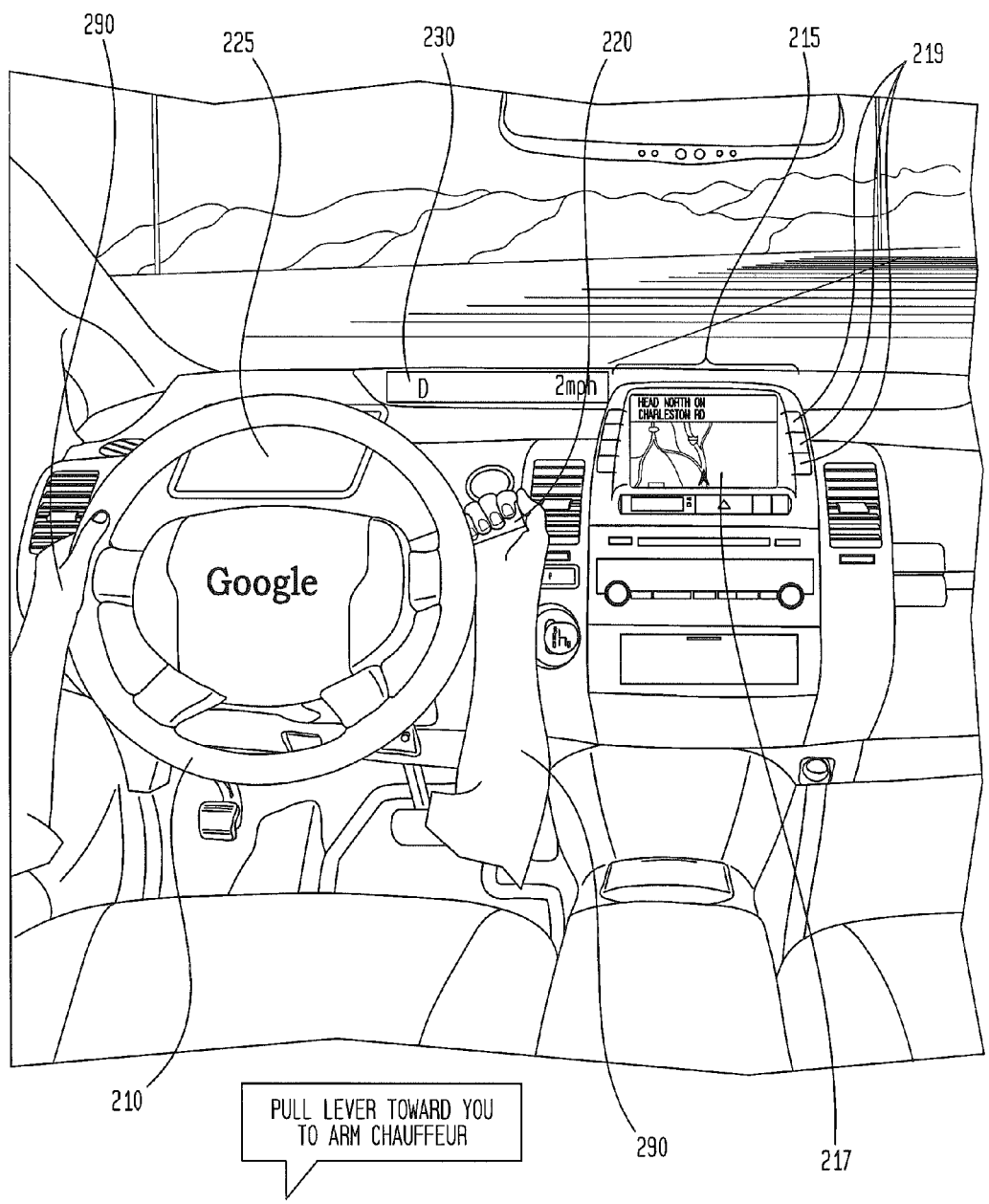
FIG. 4 is a view of the interior of an exemplary vehicle in accordance with an aspect of the invention.

In another example, shown in FIG. 4, the passenger may arm computer 110 by manipulating a lever such as gear shifter 220 into a particular position.

Figure 5:
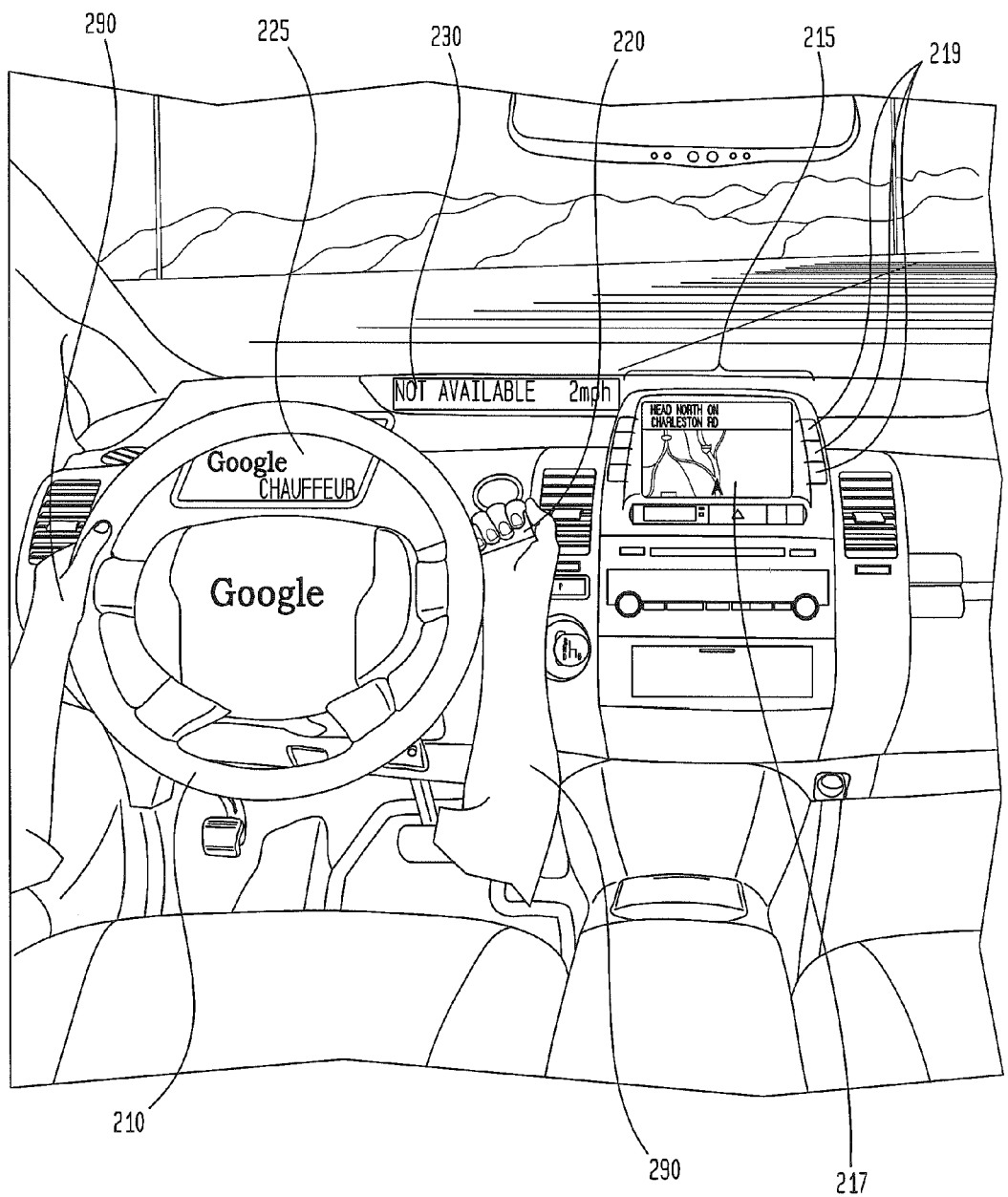
FIG. 5 is a view of the interior of an exemplary vehicle in accordance with an aspect of the invention.
Figure 6:
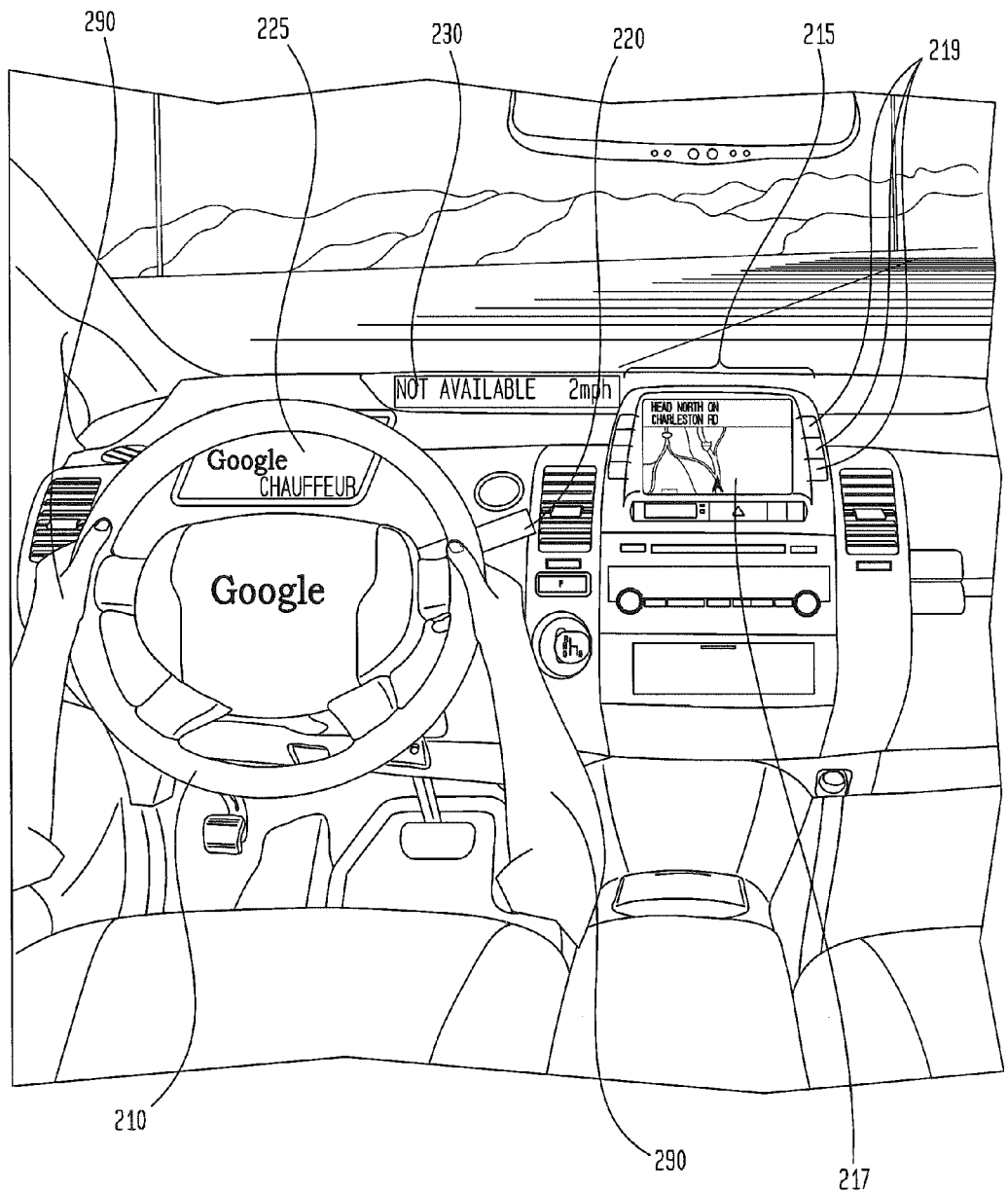
FIG. 6 is a view of the interior of an exemplary vehicle in accordance with an aspect of the invention.

In response to the engagement action, various elements of vehicle 101 may indicate that the control computer is now armed. For example, as shown in FIG. 5, display 225 may light up or display text indicating that computer 110 has been armed. Computer 110 may also provide audio indicating the same (e.g. "autonomous driving mode is engaged" or "cruise mode is engaged"). After arming computer 110, passenger 290 may return his or her hands to steering wheel as shown in FIG. 6.

Figure 7:
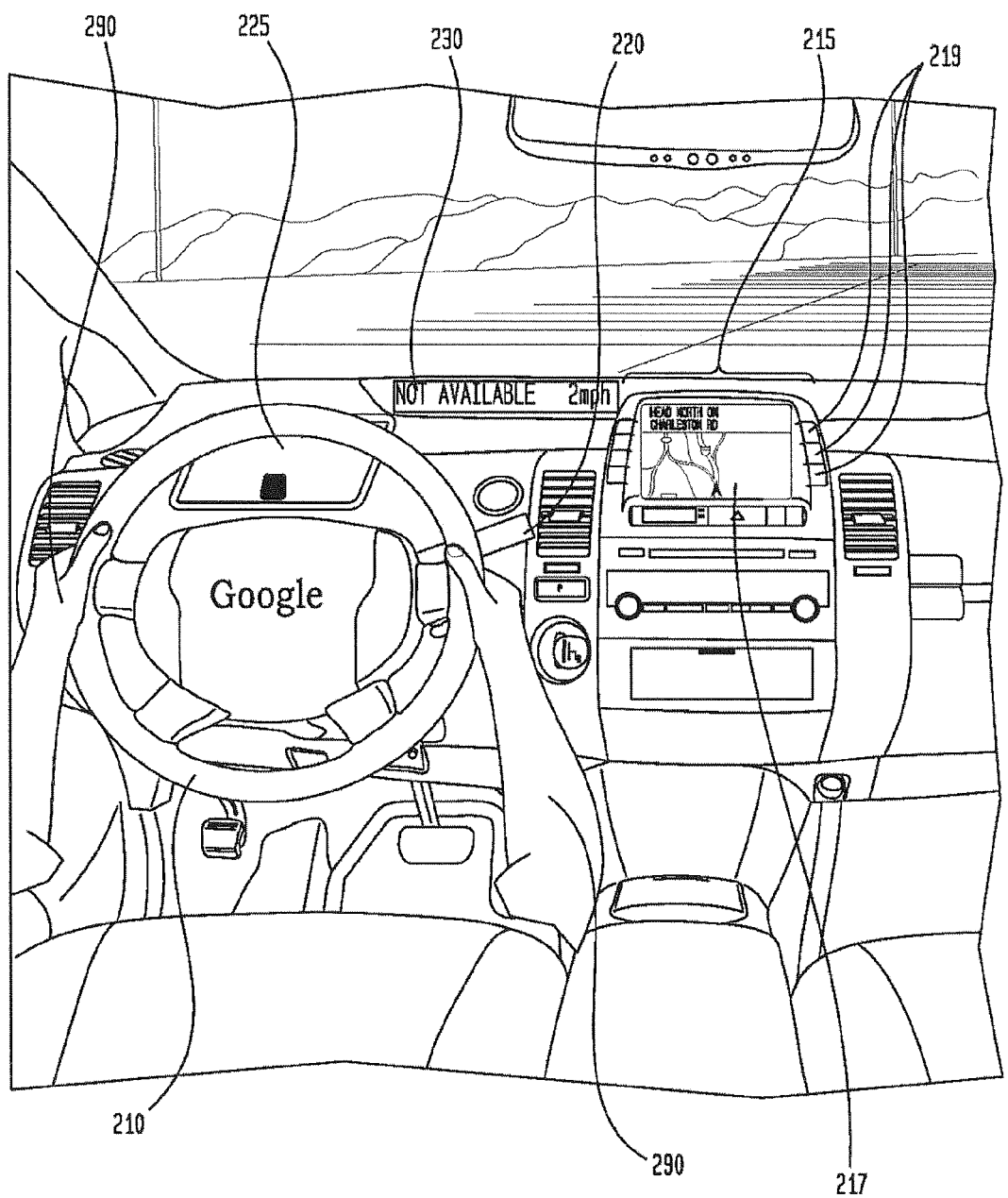
FIG. 7 is a view of the interior of an exemplary vehicle in accordance with an aspect of the invention.

Once the control computer has been engaged, it must determine whether it may competently control aspects of the vehicle. For example, computer 110 may not be able to control aspects of vehicle 101 safely if vehicle 101 is at a particular location which computer 110 is unable to identify based on the geographic location of vehicle 101, if vehicle 101 is at a particular location which is not sufficiently defined or described by detailed map 136, or if computer 110 detects a large number of obstacles in the vicinity of vehicle 101. As shown in FIG. 7, vehicle 101 is located in a parking lot which, for example, computer 110 is unable to navigate. Thus, computer 110 may display text information indicating the same on status bar 230 (e.g. "Not available").

Figure 8:
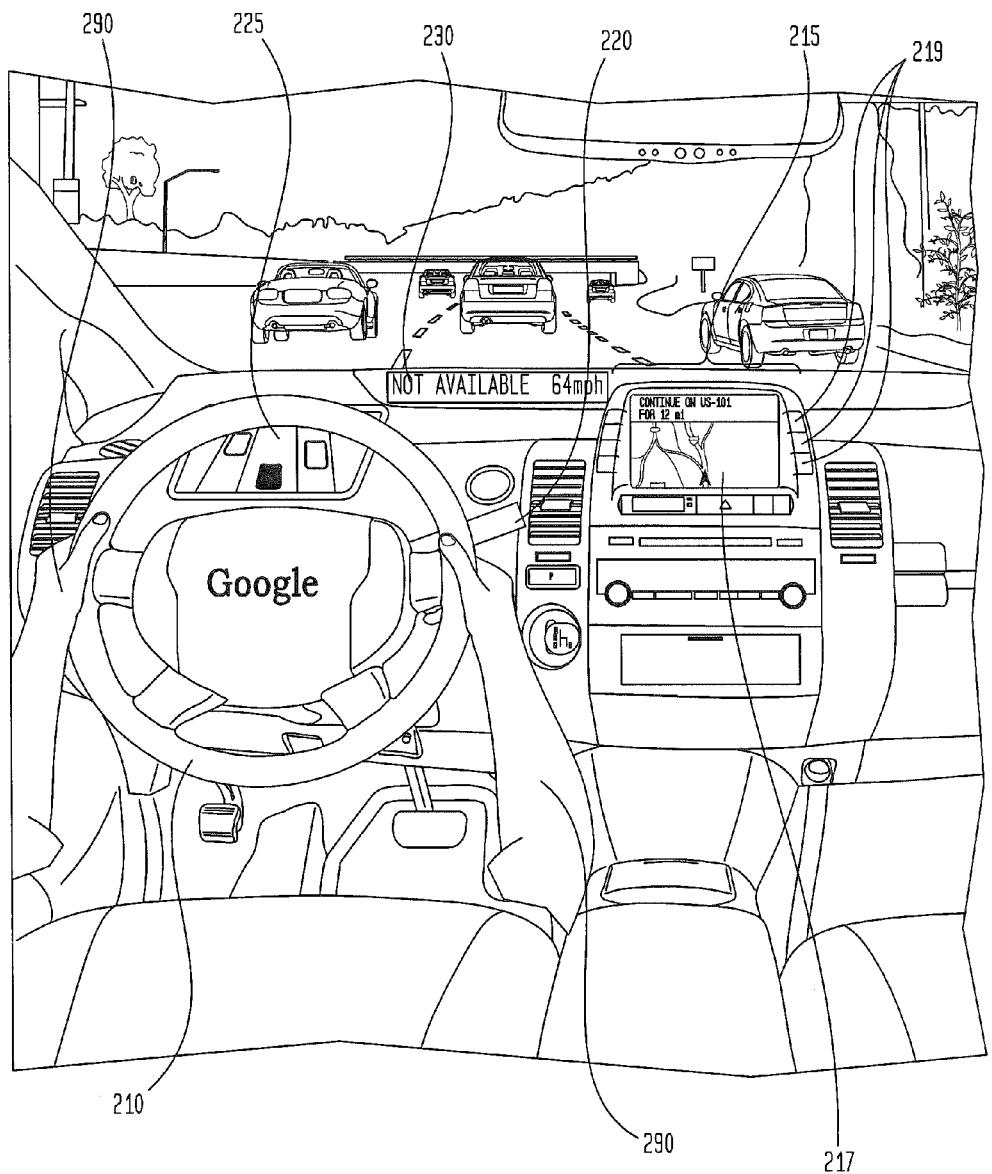
FIG. 8 is a view of the interior of an exemplary vehicle in accordance with an aspect of the invention.
Figure 9:
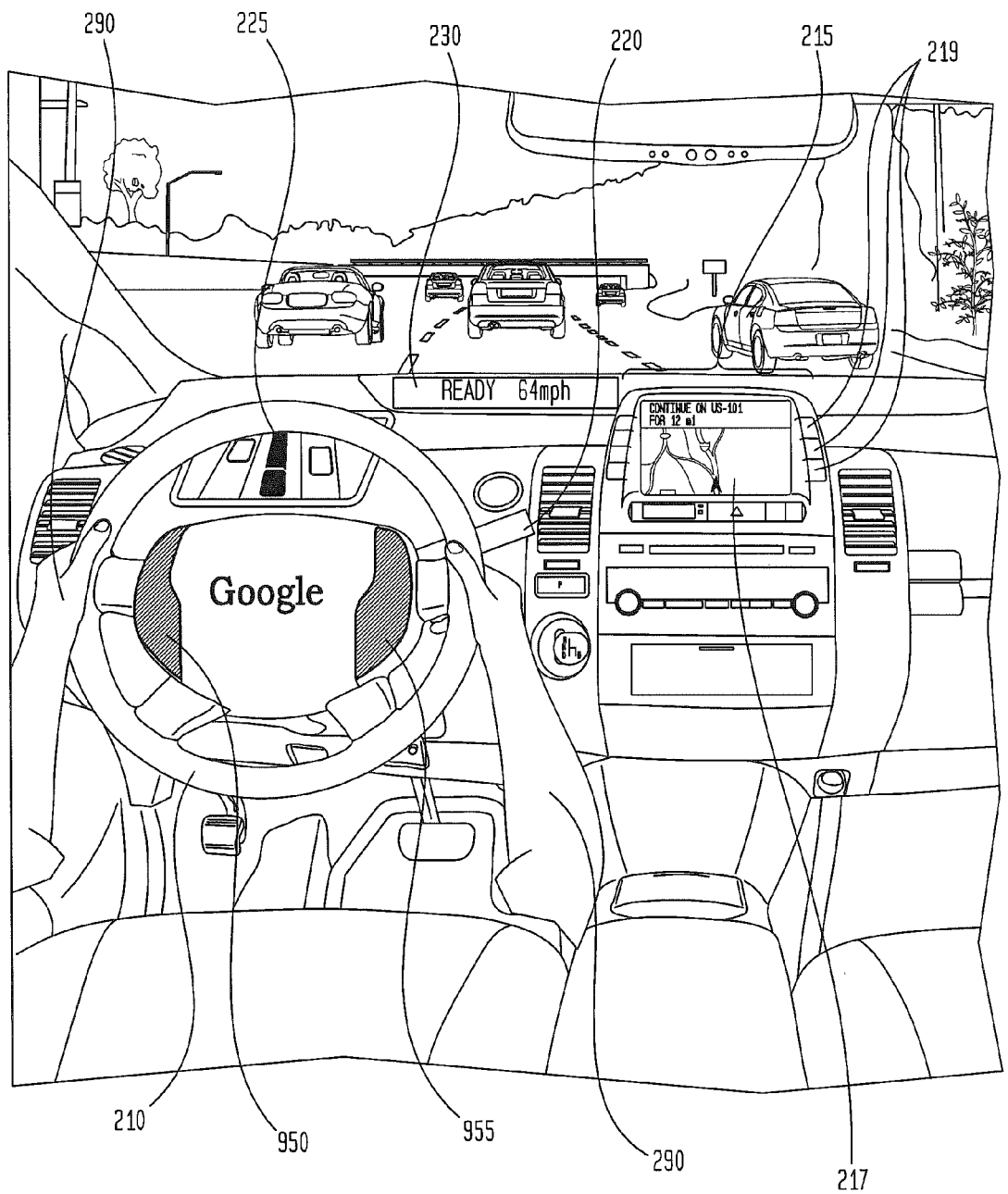
FIG. 9 is a view of the interior of an exemplary vehicle in accordance with an aspect of the invention.

Once the vehicle begins to move to new a location, the control computer may re-evaluate whether it may competently control aspects of the vehicle and display this information accordingly. For example, as shown by indicator bar 230 of FIG. 8, vehicle 101 has moved onto a roadway, computer 110 has initially determined it is unable to competently control aspects of vehicle 101. As shown in FIG. 9, once computer 110 has determined that it is able to competently control aspects of vehicle 101, indicator bar 230 may indicate that computer 110 is in the "ready" state or is able to take control of aspects of vehicle 101.

The control computer may use additional visual indicators to display the status of the control computer to a passenger. For example, computer 110 may illuminate surfaces of vehicle 101 in a particular color (or various shades of the color) to indicate the status of computer 110. Where computer 110 is ready to take control of various aspects of vehicle 101, steering wheel portions 950 and 955 as well as indicator bar 230 may illuminate gradually in a particular color, a first color. The illumination may be immediately intense or alternatively gradually increase in intensity.

Figure 10:
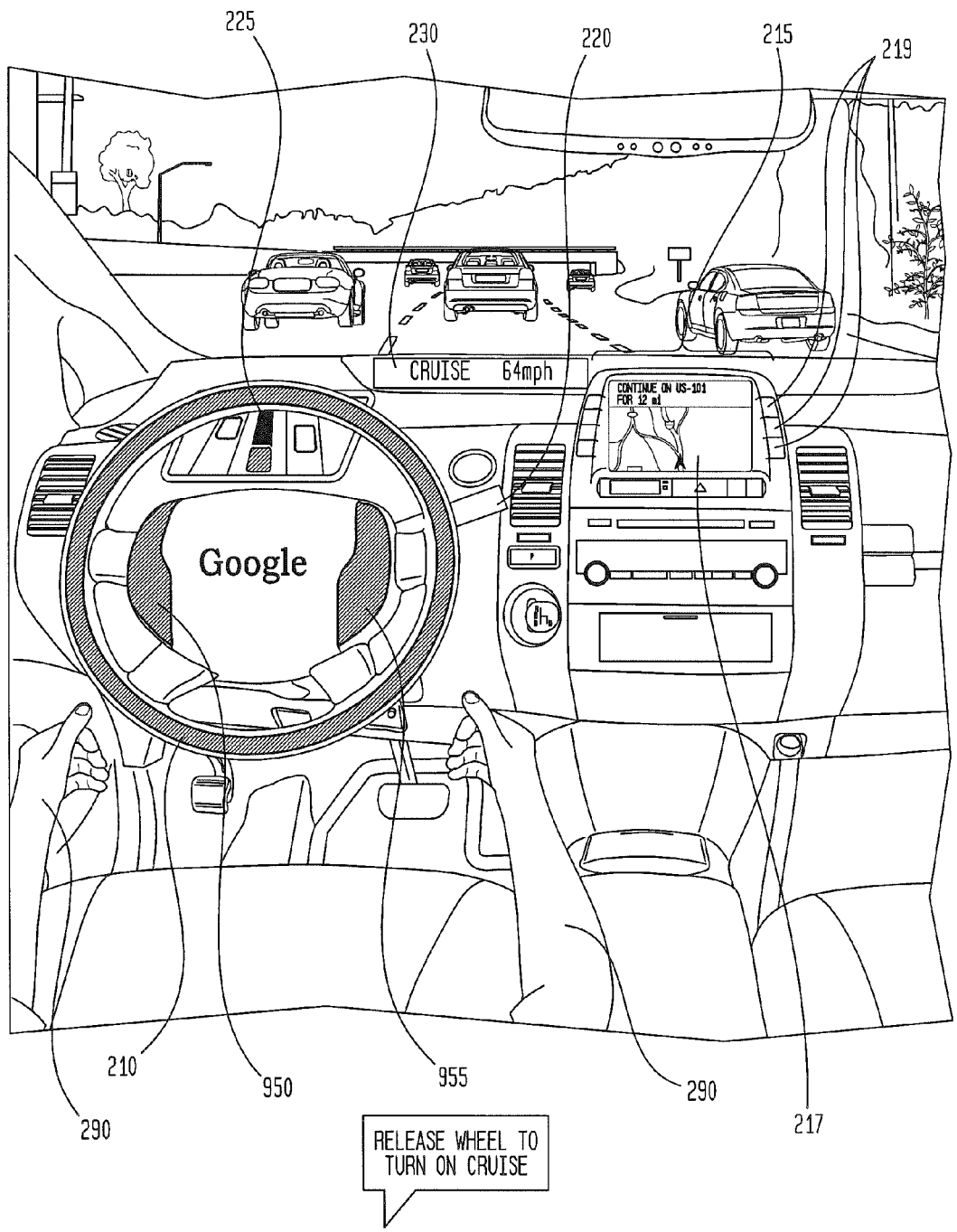
FIG. 10 is a view of the interior of an exemplary vehicle in accordance with an aspect of the invention.

Once control computer is able to control the vehicle competently, the passenger may relinquish control. For example, passenger 290 may release his or her hands from steering wheel 210. Various touch sensitive input apparatuses 140 which may be disposed, for example, around or within steering wheel 210 may be used to identify the amount of pressure on the steering wheel. If there is no more input or the input is below a particular pressure threshold, computer 110 may determine that passenger 290 has released steering wheel 210. Based on the information from the touch sensitive input apparatuses, computer 110 may begin to control various aspects of vehicle 101 as shown in FIG. 10.

As the control computer's changes, the control computer may again use various visual and audio indicators to convey this information to a passenger. For example, computer 110 may cause indicator bar 230, steering wheel portions 950 and 955, portions of display 215, and/or even portions of steering wheel 210 to illuminate in a second color, different from the first color. Computer 110 may also inform the passenger of the change using audio cues.

Figure 11:
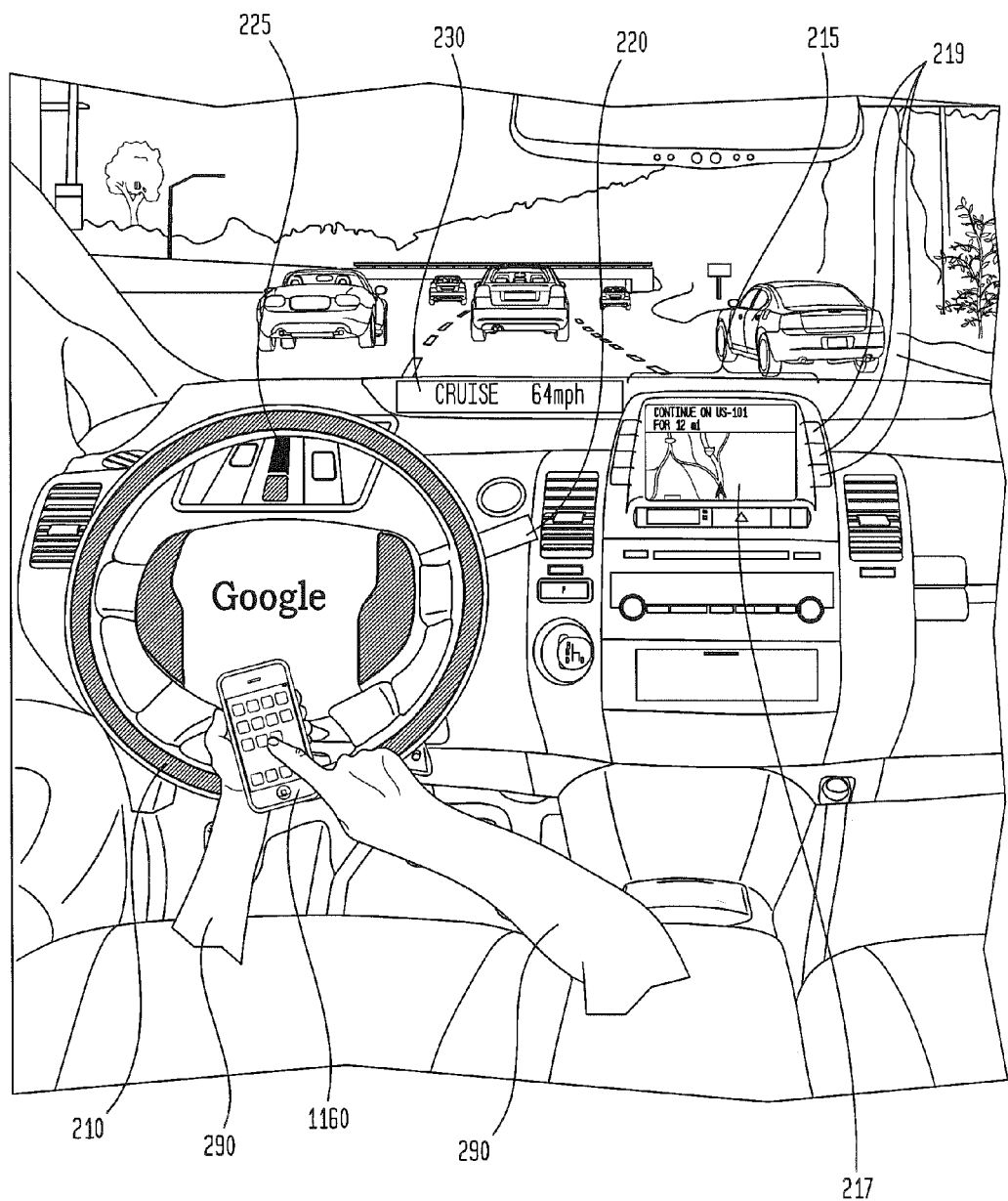
FIG. 11 is a view of the interior of an exemplary vehicle in accordance with an aspect of the invention.

Once the indicators are illuminated such that they indicate that control computer is in control of aspects of the vehicle, for example those functions required for safely driving the vehicle between locations, the user may now enjoy other pursuits. For example, as shown in FIG. 11, passenger 290 is able to use a cellular phone without fear that the distraction will take away from the safety of the trip. The indicators, such as indicator box 230 and portions of steering wheel 210, allow the passenger to feel safe in the knowledge that computer 110 is in control of the vehicle.

If the passenger identifies an emergency situation, the passenger may take control of the vehicle immediately. For example, passenger 290 may see an obstacle which computer 110 has not identified, such as a bicyclist or road construction. Without first disarming computer 110, passenger 290 may grip the steering wheel to return computer 110 to "ready mode" as shown in FIG. 9. The impact of passenger 290's hand or hands on steering wheel 210 may be received by the various touch sensitive input apparatuses 140 of steering wheel 210. Computer 110 may receive this information, determine that the passenger would like to take control, and return to ready mode. This allows the user to feel confident that he or she may take control of vehicle 101 instantaneously.

Figure 12:
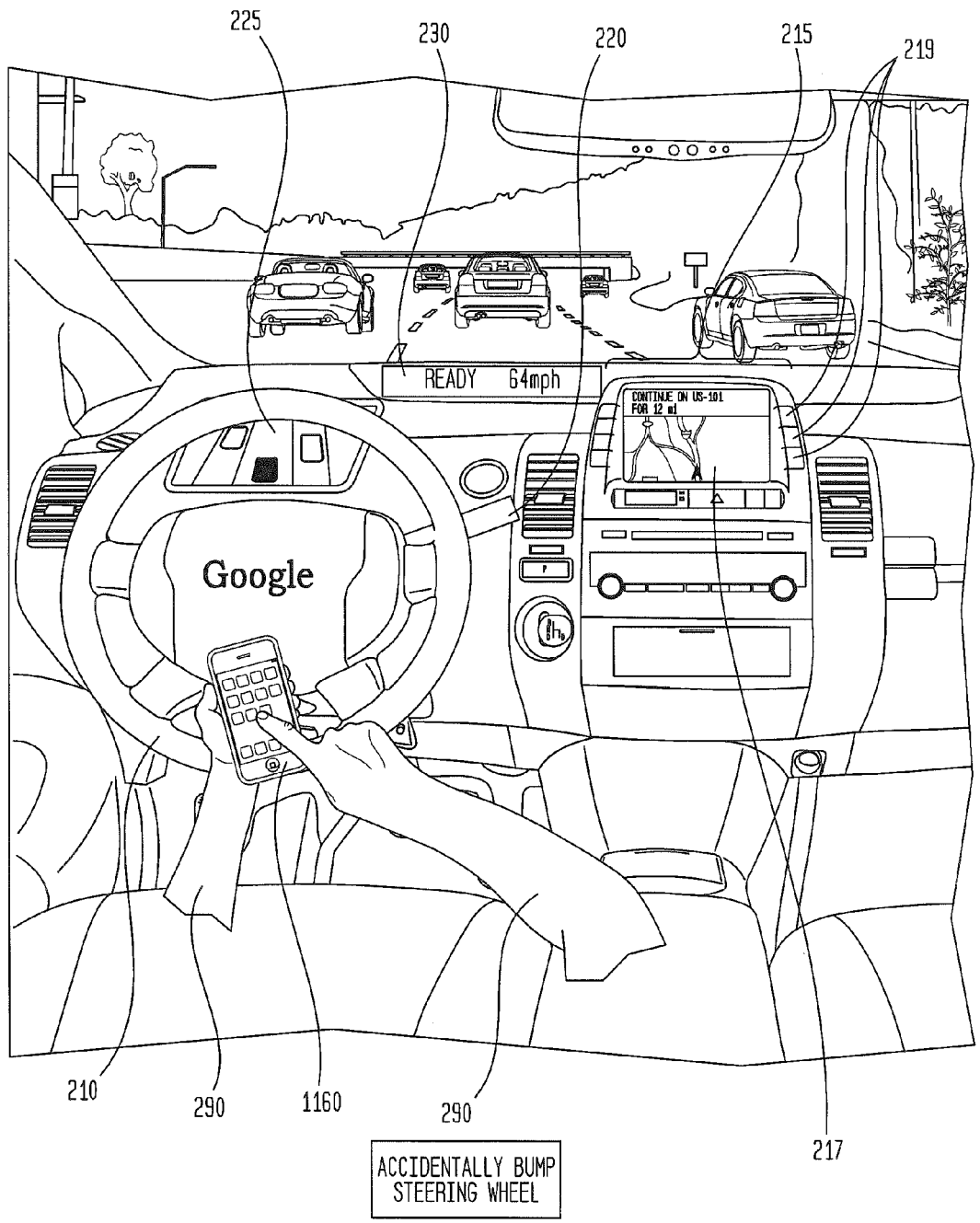
FIG. 12 is a view of the interior of an exemplary vehicle in accordance with an aspect of the invention.

In order to prevent returning the control computer to ready mode in every case of contact, the touch sensitive input apparatuses may be calibrated to prevent accidental transferring control from the control computer to the passenger. As shown in FIG. 12, passenger 290 may accidentally bump steering wheel 210 and place computer 110 into ready mode. However, it could be dangerous to allow computer 110 to relinquish control to the passenger, for example if the passenger is actually asleep or not paying attention. Thus, the touch sensitive inputs may only accept certain types of input. For example, the contact may be required to be in a particular location along steering wheel 210, for example, the top or bottoms surface of steering wheel 210 or both. In another example, the contact may be required to be over a particular time or pressure threshold as described above. In a further example, the user may be required to contact the steering wheel with two hands rather than one. Alternatively, the touch sensitive inputs may always send the inputted information to computer 110 which may determine whether the required contact or contacts have been met.

Control computer may use pressure sensing devices at other locations of the vehicle in order to determine whether the passenger is ready or able to relinquish or regain control. For example, touch sensitive input apparatuses 140 may also (or alternatively) be located on the brake and/or acceleration pedals. If computer 110 has been armed and the passenger applies some threshold pressure to the pedals, computer 110 may enter ready mode. Thus, if computer 110 is controlling vehicle 101 and passenger 290 applies the brakes, computer 110 will return to ready mode. Or if the passenger has released the steering wheel, but continues to apply pressure to the pedals, computer 110 may continue in ready mode, but request that the passenger grip the steering wheel.

In the event of an emergency situation identified by the control computer, it may immediately convey this information to the passenger in a variety of ways. For example, if computer 110 is no longer able to control vehicle 101 safely, the illuminated indicators described above may change to a third color, to inform the user of the immediate need to take control of the steering wheel. Computer 110 may also send audio alerts to passenger 290 stating that there is an emergency and the passenger is required to take control of the steering wheel.

Figure 13:
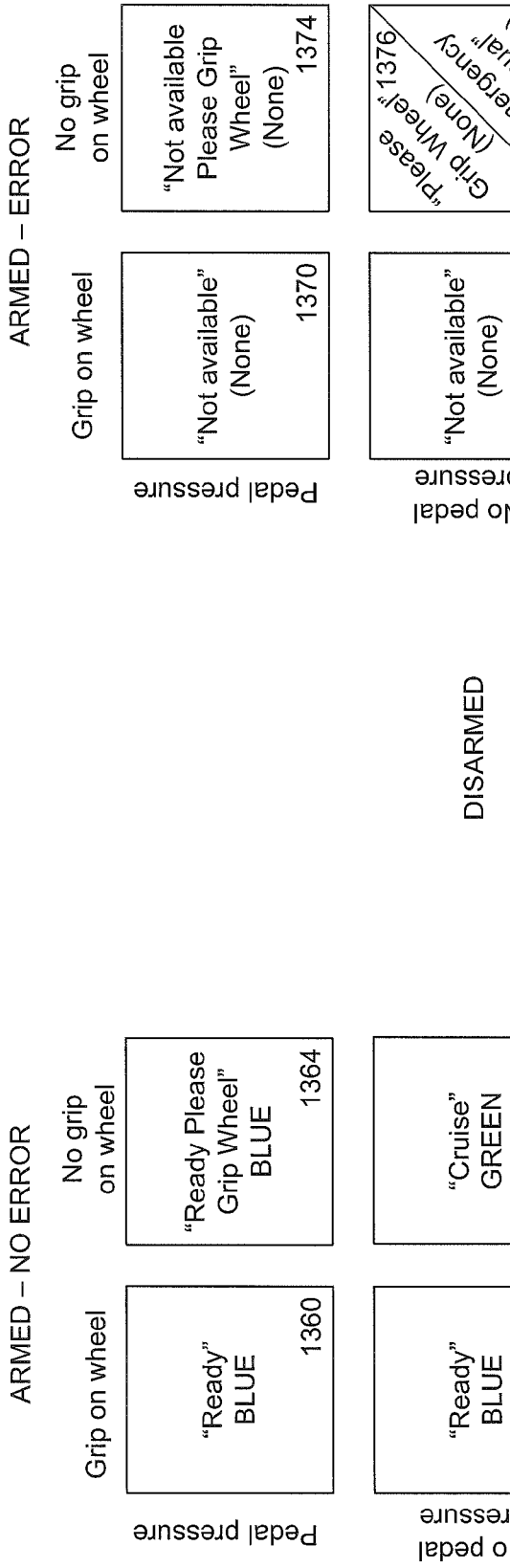
FIGS. 13A-C illustrate various states of an autonomous vehicle in accordance with aspects of the invention.

Because of the changes in the status, for example between FIGS. 9 and 10, it would be beneficial to illuminate these elements in different colors to indicate the differing statuses of the control computer. Thus, the change in the illumination may clearly convey the change in the status of computer 110. As shown in FIG. 13, computer 110 may use various color cues to identify the status of vehicle 101.

FIG. 13A is a summary exemplary colors and status indicators where computer 110 has been armed. If the passenger is gripping the steering wheel and applying, or not applying, a force on the brake or acceleration pedal, computer 110 may be in ready mode and the illumination may be blue in color as shown in blocks 1360 and 1362. If the passenger releases the grip on the steering wheel, but continues to apply pressure on one of the pedals, computer 110 may continue in ready mode and the illumination may be blue in color as shown in block 1364. Computer 110 may also display and/or sound text requesting that the passenger grip the wheel as described above. Where the passenger has released the steering wheel, is not applying a force on a pedal, and computer 110 has actually taken control, the illumination may be green in color as shown in block 1366.

FIG. 13B is a summary exemplary colors and status indicators where computer 110 has been armed, but computer 110 is unable to take control (or continue controlling) vehicle 101. If the passenger is gripping the steering wheel and applying, or not applying, a force on the brake or acceleration pedal, computer 110 may display text indicating that it is "not available" and no illumination may be used as shown in blocks 1370 and 1372. If the passenger releases the grip on the steering wheel, but continues to apply pressure on one of the pedals, computer 110 may display text indicating that it is "not available" and no illumination may be used as shown in block 1374. Computer 110 may also display and/or sound text requesting that the passenger grip the wheel as described above. If the passenger has released the steering wheel, is not applying a force on a pedal and computer 110 was not previously in control, computer 110 may again display and/or sound text requesting that the passenger grip the wheel as described above as shown in block 1376. If the passenger has released the steering wheel, is not applying a force on a pedal and computer 110 was previously in control, the illumination may be red, indicating the emergency situation as shown in block 1377. Again computer 110 may display and/or sound text requesting that the passenger take control of the vehicle.

FIG. 13C indicates exemplary colors and status indicators where computer 110 has not been armed. If computer 110 has not been armed, computer 110 need not determine whether there is any pressure or contact on the steering wheel or pedals. Thus, no illumination is required in any of blocks 1380, 1382, 1384, or 1386 as the status of computer 110 is always "off."

It will be understood that the particular combinations of color and elements selected for illumination are merely exemplary and there is no limit to the number of combinations which may be utilized.

Figure 14:
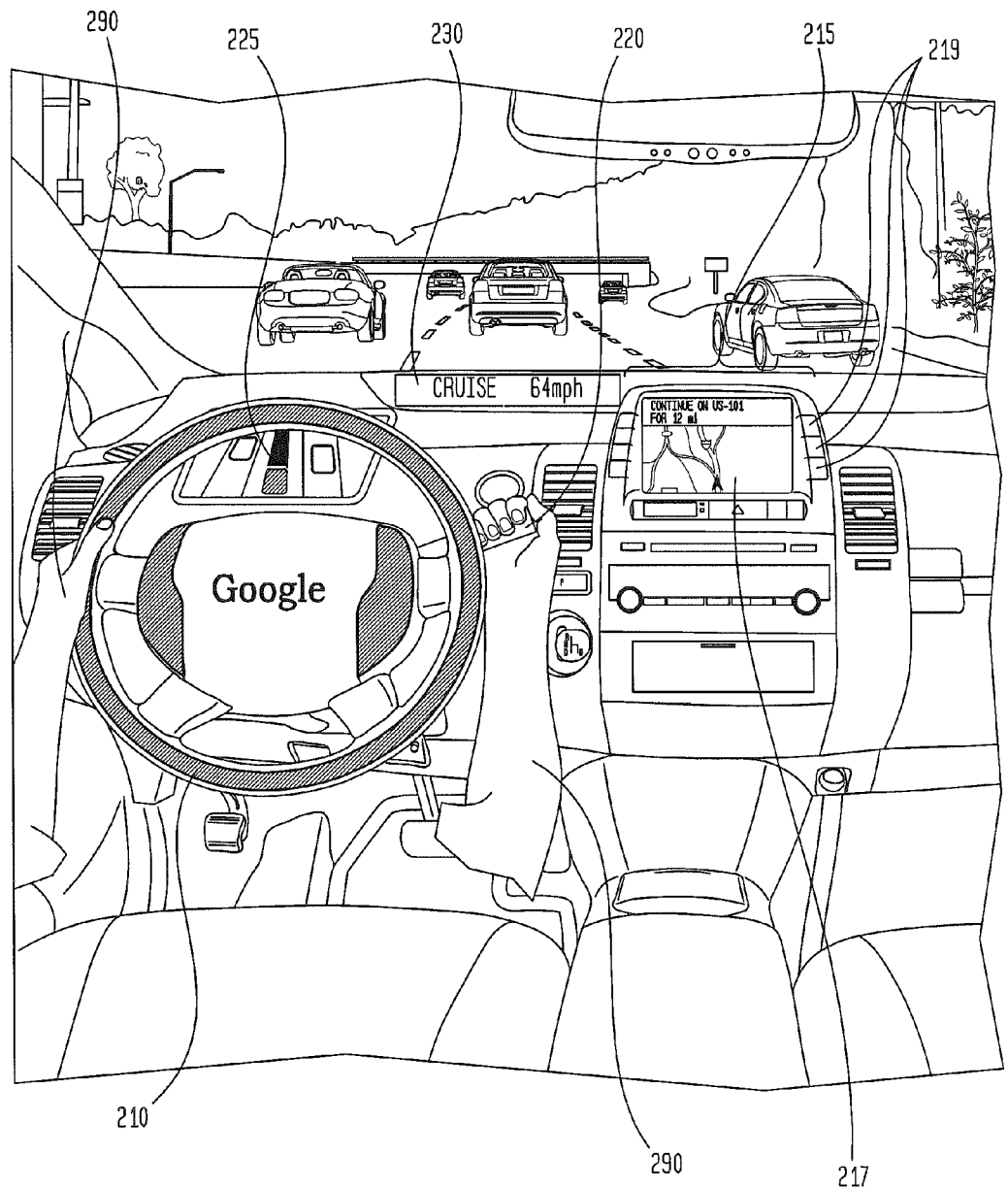
FIG. 14 is a view of the interior of an exemplary vehicle in accordance with an aspect of the invention.
Figure 15:
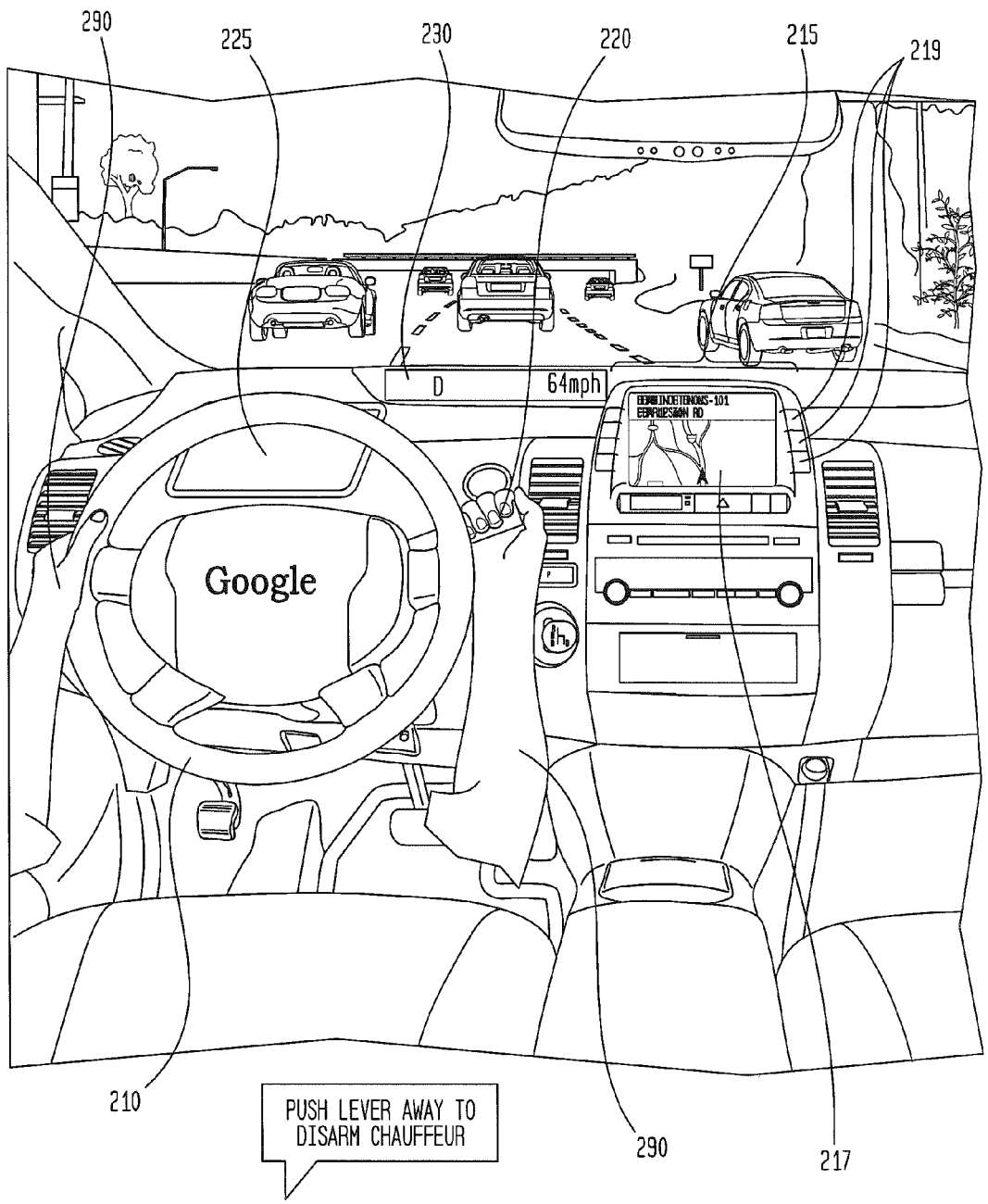
FIG. 15 is a view of the interior of an exemplary vehicle in accordance with an aspect of the invention.
Figure 16:
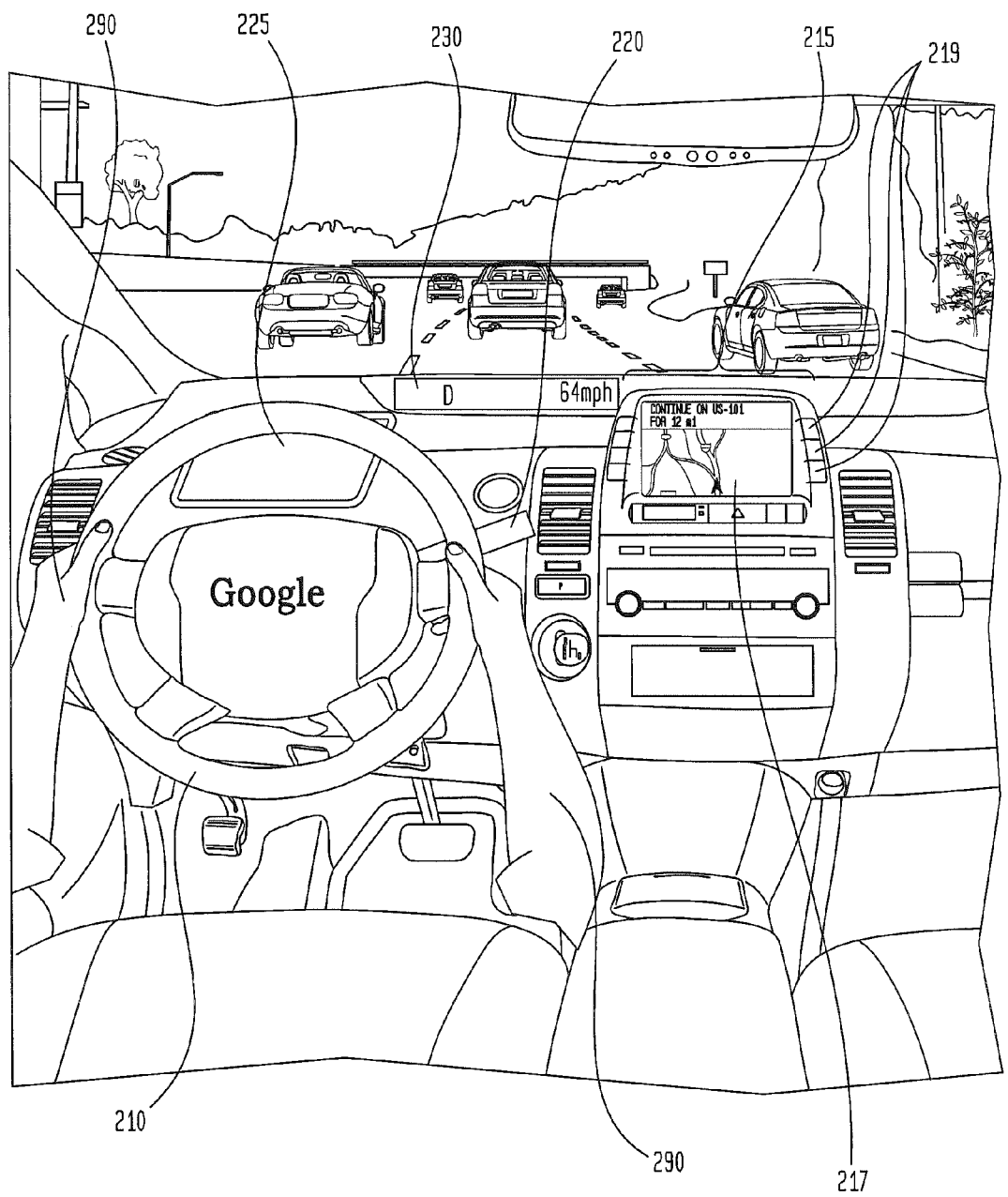
FIG. 16 is a view of the interior of an exemplary vehicle in accordance with an aspect of the invention.

The passenger may also disarm the control computer while the vehicle is moving. For example, as shown in FIG. 14, when passenger 290 is ready to disarm computer 110, the passenger may place his or her hands on steering wheel 210 and gear shifter 220. Moving the gear shifter 220 into another mode as shown in FIG. 15, such as drive, may disarm computer 110. Thus, as shown in FIGS. 15 and 16, status bar 230 may now display "D" indicating that computer 110 is no longer armed and vehicle 101 is in drive. In addition, illumination of indicator bar 230, steering wheel portions 950, 955, portions of display 215, and portions of steering wheel 210 may fade out, for example, to black, further indicating that computer 110 is no longer armed.

The control computer may be configured to take control of various aspects of the vehicle to various degrees. For example, computer 110 may take complete control of the systems of vehicle 101 and control all aspects necessary to do so, such as braking, signaling, and acceleration systems. In another example, computer 110 may only control the position of vehicle 101, such as by maintaining vehicle 101's position within a lane of traffic.

The control computer may also to determine whether the driver is able to control the vehicle and, if not, take emergency control. For example, computer 110 may be used as a safety mechanism to protect passenger 290. In addition to receiving inputs from the touch sensitive inputs, Computer 110 may use cameras to scan the passenger's eyes and/or other features. If computer 110 determines that the eyes are closed or the body is slumped over (e.g. the passenger is sleeping or under the influence of drugs or alcohol), computer 110 may take emergency control of vehicle 101 and use audible alerts to wake or otherwise get the attention of the driver.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A vehicle comprising:
   a plurality of control apparatuses including a braking apparatus, an acceleration apparatus, and a steering apparatus;
   a geographic position component for determining the current geographic location of the vehicle;
   a force input apparatus for identifying the approximate location and degree of a force;
   memory for storing a detailed map information including roadway, traffic signal, and intersection information; and
   a processor operable to:
   receive location information from the geographic position component;
   receive input from the force input apparatus;
   determine, from location information received from the geographic position component and the stored map information, the current geographic location of the vehicle;
   determine, based on the current geographic location of the vehicle, whether the processor can control the plurality of control apparatuses safely; and
   determine, based on input received from the force input apparatus, whether the processor has permission to control the plurality of control apparatuses.

2. The vehicle of claim 1, wherein the processor is operable to control the plurality of control apparatuses when the current geographic location of the vehicle corresponds to a roadway of the detailed roadway map.

3. The vehicle of claim 1, further comprising a light emitting apparatus and wherein the processor is further operable to illuminate the light emitting apparatus if the processor has determined that the processor has permission to control the control apparatuses.

4. The vehicle of claim 1, wherein the force input apparatus is associated with a threshold value, and the processor is further operable to determine that the processor has permission if a force input on the force input apparatus is less than the threshold value.

5. The vehicle of claim 1, wherein the processor is further operable to control the control apparatuses if the processor has determined that the processor has permission to control the control apparatuses.

6. The vehicle of claim 5, further comprising a light emitting apparatus and wherein the processor is further programmed to illuminate the light emitting apparatus while the processor is controlling the control apparatuses.

7. The vehicle of claim 5, wherein the processor is further operable to:
   determine, based on the current geographic location of the vehicle, whether the processor can no longer control the control apparatuses safely; and
   discontinue the controlling of the control apparatuses if the processor can no longer control the control apparatuses safely.

8. The vehicle of claim 7, further comprising a light emitting apparatus and wherein the processor is further operable to illuminate the light emitting apparatus if the processor discontinues the controlling of the control apparatuses because the processor can no longer control the control apparatuses safely.

9. The vehicle of claim 5, wherein the force input apparatus is associated with a threshold value and the processor is further operable to discontinue control of the control apparatuses if a force input on the force input apparatus is greater than the threshold value.

10. The vehicle of claim 5, further comprising a light emitting apparatus and wherein the processor is further operable to:
    illuminate the light emitting apparatus in a first color if the processor can control the plurality of control apparatuses safely and the processor is not controlling the control apparatuses;
    control the control apparatuses and illuminate the light emitting apparatus in a second color if the processor has determined that the processor has permission to control the control apparatuses; and
    illuminate the light emitting apparatus in a third color if the processor discontinues the controlling of the control apparatuses because the processor can no longer control the control apparatuses safely.

11. A method for controlling a plurality of control apparatuses of a vehicle including a braking apparatus, an acceleration apparatus, and a steering apparatus, the method comprising:
    receiving location information from a geographic position component for determining a current geographic location of the vehicle;
    receiving input from a force input apparatus identifying an approximate location and degree of a force;
    determining, from the location information received from the geographic position component and detailed map information, the current geographic location of the vehicle, the detailed map information including roadway, traffic signal and intersection information;
    determining, based on the current geographic location of the vehicle, whether a processor is operable to control the plurality of control apparatuses safely;
    determining, based on input received from the force input apparatus, whether the processor has permission to control the plurality of control apparatuses; and
    controlling the control apparatuses if the processor has permission to control the control apparatuses.

12. The method of claim 11, wherein:
    the force input apparatus is associated with a force threshold value; and
    determining that the processor has permission is based on whether a force input on the force input apparatus is less than the threshold value.

13. The method of claim 11, further comprising illuminating a light emitting apparatus if the processor is not operable to control the control apparatuses safely.

14. The method of claim 11, further comprising illuminating a light emitting apparatus while the processor is controlling the control apparatuses.

15. The method of claim 11, wherein if the processor is not operable to control the control apparatuses safely, then discontinuing the controlling of the control apparatuses by the processor.

16. A computer comprising:
    memory for storing map information; and
    a processor operable to:
    receive location information from a geographic position component which determines a current geographic location of the vehicle;
    receive input from a force input apparatus which identifies an approximate location and degree of a force;
    determine, from the location information received from the geographic position component and the stored map information, the current geographic location of the vehicle;
    determine, based on the current geographic location of the vehicle, whether the processor is operable to control a plurality of control apparatuses safely; and
    determine, based on input received from the force input apparatus, whether the processor has permission to control the plurality of control apparatuses.

17. The computer of claim 16, wherein the plurality of control apparatuses control an automobile.

18. The computer of claim 17, wherein the plurality of control apparatuses control a boat.

19. The computer of claim 18, wherein the plurality of control apparatuses control an airplane.

20. The computer of claim 16, wherein the processor is further operable to:
    illuminate light emitting apparatus in a first color if the processor is operable to control the plurality of control apparatuses safely and the processor is not currently controlling the control apparatuses;
    control the control apparatuses if the processor has determined that the processor has permission to control the control apparatuses and illuminate the light emitting apparatus in a second color; and
    illuminate the light emitting apparatus in a third color if the processor discontinues the controlling of the control apparatuses because the processor can no longer control the control apparatuses safely.

* * * * *